April 13, 1937. V. BUSH 2,076,977
LUBRICATING SYSTEM FOR VEHICLE WHEEL BEARINGS
Filed Feb. 13, 1936
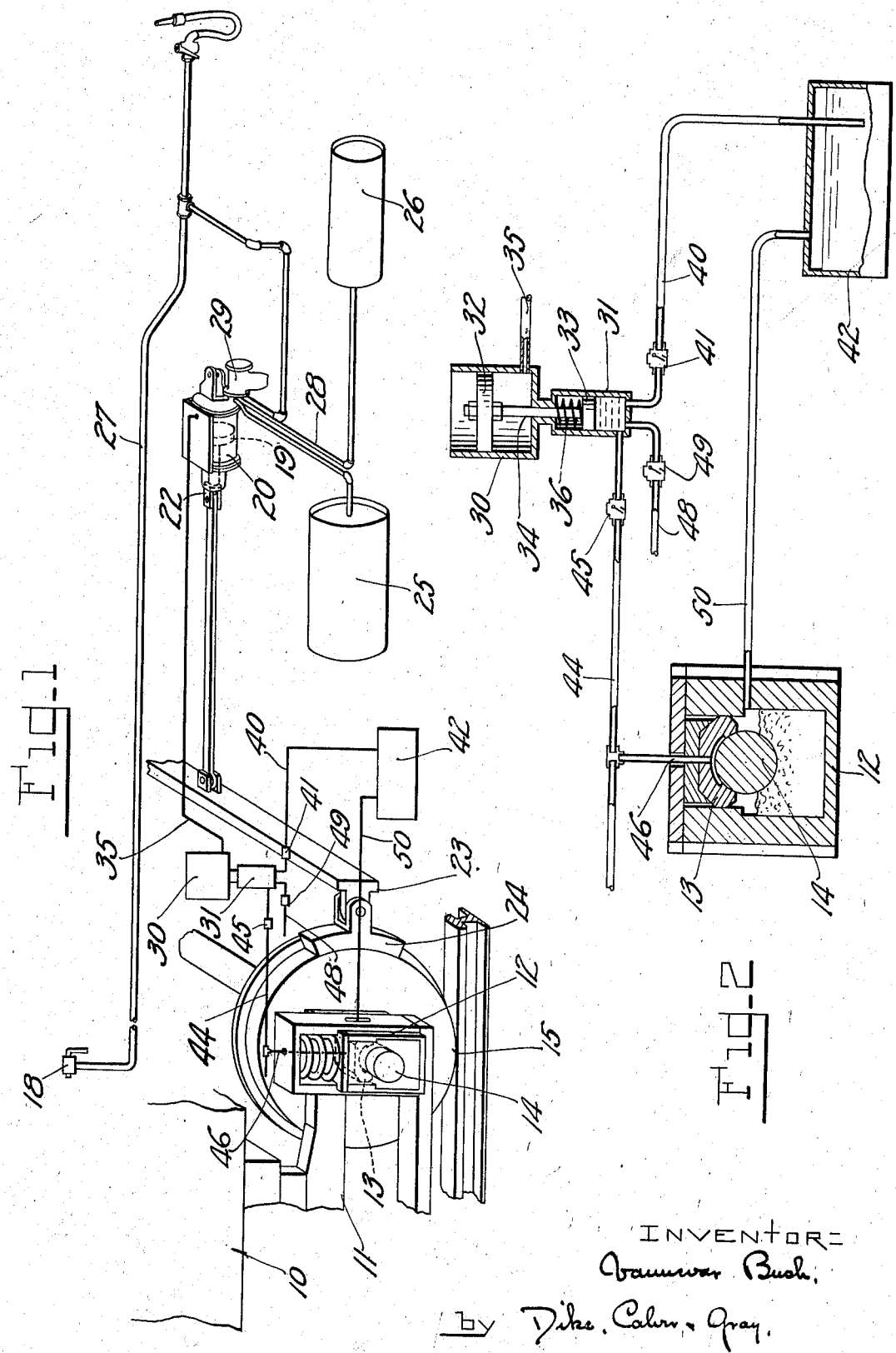
INVENTOR:
Vannevar Bush.
by Dike, Calver, Gray.
Attys.

Patented Apr. 13, 1937

2,076,977

UNITED STATES PATENT OFFICE 2,076,977

LUBRICATING SYSTEM FOR VEHICLE WHEEL BEARINGS

Vannevar Bush, Belmont, Mass., assignor, by mesne assignments, to Research Corporation, New York, N. Y., a corporation of New York Application February 13, 1936, Serial No. 63,706

3 Claims. (Cl. 184—7)

This invention relates to the lubrication of journal bearings, such as the journal box bearings of railway rolling stock.

It is an object of the present invention to improve the lubrication of such bearings in such a manner as to allow a locomotive to pick up a long train smoothly as well as to reduce friction, wear and heating in the bearings.

An important cause of heating and wear in journal boxes is the difficulty in securing proper lubrication at the time of starting and accelerating the vehicle. Positive means for supplying lubricant at this time is desirable because friction of rest is greater than friction of movement and also because when a vehicle, such as a railway car, has been standing at rest for some time the film of lubricant between the bearings and axles becomes diminished.

The present invention contemplates a device adapted to inject lubricant under pressure between an axle and its bearing at the time of starting and accelerating rotation of the axle. More particularly, the invention contemplates a device of this character which is associated with a car brake mechanism and arranged to inject lubricant under pressure between the bearing and axle when the brakes are released. Inasmuch as the brakes are set when a car is at rest, they must be released before starting movement of the car. Consequently, proper lubrication is assured at the time of starting and acceleration.

The invention will be more clearly understood from the following description in conjunction with the accompanying drawing: in which, Fig. 1 is a view, partly in diagram, showing the application of my invention to a railway car; and Fig. 2 is a detail sectional view of a portion of the construction shown in Fig. 1.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the accompanying drawing, there is illustrated a railway car 10 provided with an axle truck 11 having a journal box 12 in which is located a bearing 13 for rotatably receiving an axle 14 to which a wheel 15 is secured. The car 10 is provided with an air brake system of any usual or suitable type including a train pipe 27, an engineer's valve 18, and a brake cylinder 20 containing a piston 19 provided with a piston rod 22 which is connected through an equalizing member 23 with a brake shoe 24 adapted to engage one of the wheels 15. The particular brake system shown is of the well known automatic type including a main supply reservoir 25 for air under pressure and an auxiliary reservoir 26, the reservoirs 25 and 26, the cylinder 20, and train pipe 27 being connected by a conduit system 28 having a triple valve 29 interposed therein, and the engineer's valve 18 being operable to reduce the pressure in the train pipe, thereby causing the triple valve to admit air from the auxiliary reservoir to the brake cylinder to apply the brake, or to admit pressure to the train pipe, thereby causing the triple valve to exhaust the brake cylinder and release the brake, at the same time recharging the auxiliary reservoir, all as will be familiar to those skilled in the art.

In accordance with the present invention, a device is associated with the brake system and operated thereby to supply lubricant between the bearing 13 and the axle 14. This device comprises a pair of cylinders 30 and 31 in which pistons 32 and 33 are movable, respectively. The pistons 32 and 33 are connected by a rod 34 to move in unison. A coil spring 36 surrounds the rod 34 and extends between the piston 33 and the top of the cylinder 31. Below the piston 32 the cylinder 30 is connected by a conduit 35 with the pressure receiving end of the brake cylinder 20, or with some region directly communicating therewith. In a system of the straight air type, in which pressure is admitted to the train pipe to apply the brakes and exhausted therefrom to release the brakes, the conduit 35 may connect the cylinder 30 with the train pipe. A conduit 40 containing a check valve 41 connects the bottom of the cylinder 31 with a lubricant supply tank or reservoir 42. A conduit 44 having a check valve 45 provides communication between the bottom of the cylinder 31 and the bearing 13 through a branch 46 passing through an opening in said bearing. If desired, another conduit 48 having a check valve 49 may be provided to afford communication between the cylinder 31 and other journal boxes of the car, and the pipe 44 may also be extended beyond the branch 46 for the same purpose. A conduit 50 provides communication between the interior of the journal box 12 at its center level and the supply tank 42 to permit return of lubricant to the latter.

In operation, when pressure is admitted to the brake cylinder 20 to apply the brakes, said pressure is transmitted through the conduit 35 to the lower end of the cylinder 30 beneath the piston 32, causing said piston and the connected piston 33 to rise against the pressure of the spring 36 and thereby draw lubricant from the reservoir 42 through the conduit 40 and check valve 41 into the bottom of the cylinder 31. When the pressure in the brake cylinder 20 is relieved to release the brakes, the pressure in the lower end of the cylinder 30 is likewise relieved, permitting the spring 36 to move the pistons 32 and 33 downwardly, and forcing lubricant from the lower end of the cylinder 31 through the check valve 45 and conduits 44 and 46 into the bearing 13, the excess lubricant draining back into the reservoir 42 through the conduit 50. It will thus be seen that, when the brakes are released as a preliminary to starting, the journal box bearings will be assured of an adequate supply of lubricant for smooth and easy starting and acceleration, notwithstanding the fact that lubricant previously supplied may have drained out as the result of long standing. It will be obvious that the particular arrangement of the apparatus, in accordance with the particular type of fluid pressure brake system in connection with which it is used, is susceptible of considerable variation in order to provide means, responsive to variations in pressure conditions in the brake system incidental to applying and releasing the brakes, for drawing lubricant from a reservoir when the brakes are applied and supplying it to the axle bearings when the brakes are released.

I claim:

1. In a vehicle having an axle, a bearing for rotatably receiving said axle, a brake, and means for applying and releasing said brake including a fluid pressure system, the combination therewith of a lubricant supply source, and means for withdrawing lubricant from said source as the brakes are applied and for supplying it between said bearing and axle as the brakes are released, said means including a cylinder, a piston in said cylinder, means for supplying fluid pressure from said fluid pressure system to said cylinder to move said piston in one direction, and means for moving said piston in the opposite direction.

2. In a vehicle having an axle, a bearing for rotatably receiving said axle, a brake, and means for applying and releasing said brake including a compressed air system, the combination therewith of a lubricant supply source, and means for withdrawing lubricant from said source and for supplying it between said bearing and axle including a cylinder, a piston movable in said cylinder, a conduit connecting said cylinder and said source, a conduit for supplying lubricant from said cylinder between said bearing and axle, and means including a connection with said compressed air system for moving said piston in opposite directions, whereby when said piston is moved in one direction lubricant is supplied from said source to said cylinder and when said piston is moved in the opposite direction lubricant is supplied from said cylinder between said bearing and axle.

3. In a vehicle having an axle, a bearing for rotatably receiving said axle, a brake, and means for applying and releasing said brake, including a compressed air system, the combination therewith of a lubricant supply source, a pair of cylinders, a piston movable in each of said cylinders, a connection between said pistons whereby movement of one causes movement of the other, means for supplying compressed air from said system to one of said cylinders to move said pistons in one direction, a conduit connecting said source and the other cylinder whereby lubricant is supplied to the latter when said pistons are so moved, and means for supplying lubricant from said other cylinder between said bearing and axle including means for moving said pistons in the opposite direction.

VANNEVAR BUSH.